Sept. 13, 1960

W. K. PRILL ET AL 2,952,480

FASTENING DEVICE DETACHABLY COUPLING
GROOVED CYLINDRICAL SURFACES

Filed Oct. 22, 1956

WILLIAM K. PRILL,
GABRIEL MARASON,
INVENTORS.

By THEIR ATTORNEYS.

HARRIS, KIECH, FOSTER & HARRIS.

United States Patent Office 2,952,480
Patented Sept. 13, 1960

1

2,952,480

FASTENING DEVICE DETACHABLY COUPLING GROOVED CYLINDRICAL SURFACES

William K. Prill, Costa Mesa, and Gabriel Marason, Anaheim, Calif., assignors to Beckman Instruments, Inc., Fullerton, Calif., a corporation of California Filed Oct. 22, 1956, Ser. No. 617,335

3 Claims. (Cl. 285—18)

This invention relates to a device for joining two elements having mating cylindrical surfaces so that the two elements may be rotatably adjusted relative to each other while their axial relation is being maintained constant. The invention also relates to such a device which is used in repeatedly joining and separating the two elements.

It is often desired to join two or more cylindrical elements in end-to-end relation while making provisions for rotational adjustment of the individual elements. A typical example of such an arrangement is the ganging of a plurality of electrical potentiometers for operation by a single shaft.

Previously known devices for clamping two elements in end-to-end relation included such undesirable items as separate clamps which are attached to both elements and substantially increase the diameter of the joined elements, or protruding ears on both elements which are connected by screws, or radial holes drilled and tapped in telescoping sections, or fixed connections which prevent rotating adjustment.

It is an object of this invention to provide a device for joining two elements end-to-end which provides precise control of the axial alignment of the two elements and permits rotational adjustment of the two elements, the two elements being capable of being separated and rejoined at any time. It is a further object of the invention to provide such a fastening device which does not require any increase in physical dimension of the elements and which can be utilized without disturbing the smooth exterior or smooth interior of the elements by separate clamps, radial screws, lugs or the like.

It is a further object of the invention to provide means for coupling two elements together so that they are rotatable relative to each other and so that they may be disconnected at will, the elements being telescopingly engageable and having corresponding ridges extending radially therefrom providing bearing surfaces facing toward each other with a clamp formed in an arc positionable between the bearing surfaces and in contact with each for urging the elements together.

It is another object of the invention to provide means for joining two elements in end-to-end relation with the elements having telescopingly engageable surfaces which have corresponding peripheral grooves for receiving a clamp formed into an arc, the clamp acting on the walls of the grooves urging the elements together when the elements are rotated relative to each other in one direction and automatically feeding itself out of the grooves when the elements are relatively rotated in the opposite direction.

The invention also comprises novel details of construction and novel combinations and arrangements of parts, which will more fully appear in the course of the following description. The drawing merely shows and the description merely describes preferred embodiments of the present invention which are given by way of illustration or example.

2

Figure 1:
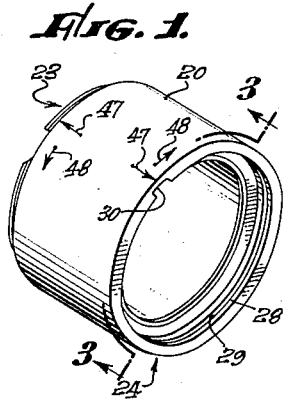
Fig. 1 is an isometric view showing the socket end of an element in detail.

While the actual physical shape of the elements joined by the invention is not relevant to the operation thereof, the invention is especially adapted for the joining of cylindrical elements since two cylinders of the same diameter may be joined to create a single absolutely smooth cylinder except for the joint line. When hollow cylinders are being joined, either the internal or the external surface may be the absolutely smooth one and the invention will be described herein as applied to the joining of hollow cylinders with smooth exteriors.

An element 20 is joined with an element 21 with a clamp 22. The elements 20 and 21 are identical, each having a plug end 23 and a socket end 24 so that a plurality of such elements may be ganged together end-to-end in the same manner as the element 21 and another element 25 shown in Fig. 2.

The socket end of the element 20 is provided with an internal cylindrical surface 28 with a peripheral groove 29 therein. In the embodiment of the invention presently being described, this groove is preferably rectangular in shape for reasons which will subsequently become apparent. A notch 30 is provided in the internal cylindrical surface 28 of the element 20. This notch provides mounting space for one end of the clamp 22 described in conjunction with this preferred embodiment of the invention. However, when desired, other means may be provided for locating one end of the clamp, in which event the notch 30 may be omitted.

Figure 2:
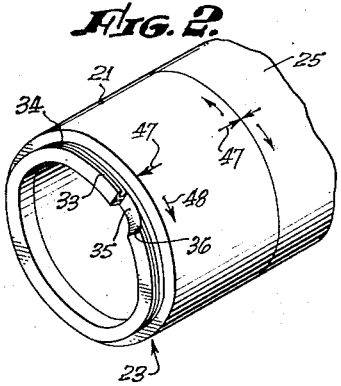
Fig. 2 is an isometric view showing two elements joined together and showing the plug end of one of the elements in detail.

The plug end of the element 21 has an external cylindrical surface 33 which telescopingly engages the surface 28 of the element 20. A peripheral groove 34 in the cylindrical surface 33 corresponds to the groove 29 in the surface 28 and is positioned so that when the two elements are telescopingly engaged, the two grooves will overlap each other. A notch 35 in the cylindrical surface 33 is made at least as deep as the groove 34, the notch in the element 21 being cut completely through the wall of the element, this shape of notch being easily made in a hollow cylindrical element. The wall 36 of the notch is preferably sloped, such as shown in Fig. 2, making disengagement of the two elements easier to perform.

Figure 10:
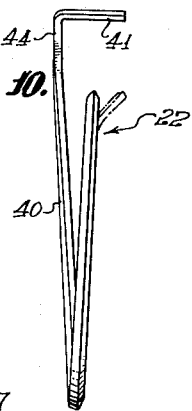
Fig. 10 shows a preferred form for the clamp of the invention.
Figure 3:
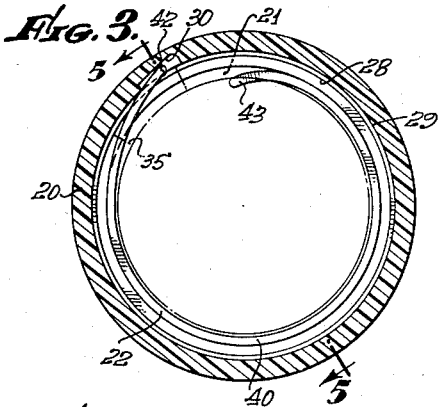
Fig. 3 is an enlarged sectional view taken along the line 3—3 of Fig. 1 with a second element shown in phantom positioned ready for rotating engagement with the first element.

A preferred form for the clmp 22, which is made of a resilient material such as spring steel, beryllium copper, or the like, is shown in the rest position in Figs. 3 and 10. A central portion 40 is formed into an arc, preferably less than a full revolution so as to provide clearance between ends of the clamp. One end 41 of the clamp is bent at right angles to the central portion 40 and is adapted to be a push fit into an opening 42 located at the notch 30 adjacent the groove 29 of the element 20 for mounting the clamp to the element. The other end 43 of the clamp is bent out of the arc, being bent inward in the embodiment shown herein. If it is desired to join two elements having cylindrical axial openings therethrough and to have a smooth internal surface at the junction, the clamp would be carried on the element having the plug end and the notch corresponding to the notch 35 would be provided in the element having the socket end with the end of the clamp that is bent out of the arc being bent outward.

The central portion 40 of the clamp 22, except for a short portion 44 adjacent the end 41, is preferably formed in a helix as seen in Fig. 10. In the preferred embodiment, the clamp is rectangular in cross section (Figs. 5 and 6) with the short portion 44 lying in a plane perpendicular to the axis of the arc and the remainder of the central portion twisted relative to the short portion. In one embodiment, the initial twenty degrees of the arc adjacent the end 41 is flat, lying in the plane perpendicular to the axis of the arc, and the remainder of the central portion is twisted twenty degrees relative to the initial portion and is helixed at a one-eighth pitch.

Figure 5:
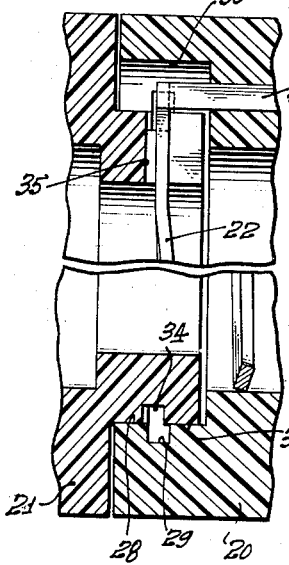
Fig. 5 is an enlarged partial sectional view taken along the line 5—5 of Fig. 3.
Figure 6:
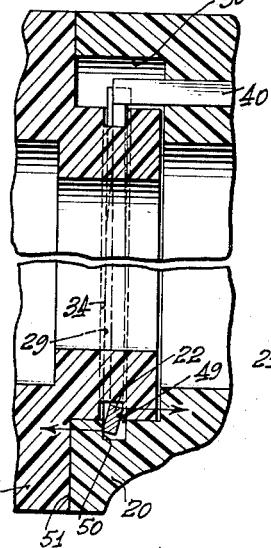
Fig. 6 is an enlarged partial sectional view taken along the line 6—6 of Fig. 4.

The elements 20 and 21 may be joined together by telescopingly engaging the respective plug and socket ends with axial arrows 47 aligned, the arrows indicating the positions of the end 41 of the clamp and the notch 35 respectively. When the elements are thus engaged, a section of the short portion 44 of the clamp adjacent the end 41 is positioned in the groove 29 of the socket end of the element 20 with the remainder of the clamp being pushed into the interior of the element 20 (Figs. 3 and 5). The two elements are now rotated relative to each other in the direction of the circumferential arrows 48. As the elements are rotated, the central portion of the clamp feeds into the overlapping grooves and, after a complete revolution, the entire clamp is positioned in the grooves. The assembled elements are now in the condition shown in Fig. 6 with the compressed clamp exerting forces against a bearing surface 49 of the element 21 and a bearing surface 50 of the element 20 urging the two elements together, the engagement of the elements at surfaces 51 acting as a stop to accurately position the elements axially.

When two elements are thus joined, they may be rotated relative to each other in the direction of the arrows 48, any number of revolutions to any position without disturbing their axial alignment and without possibility of separating the elements.

Figure 4:
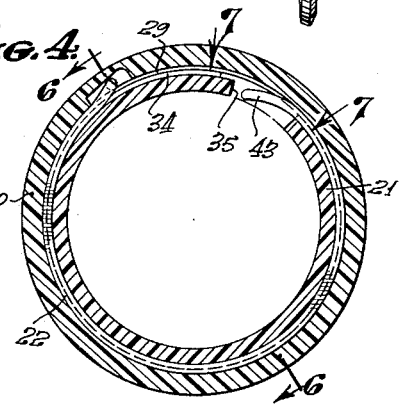
Fig. 4 is a view similar to Fig. 3 showing the two elements fully engaged.
Figures 7, 8, 9:
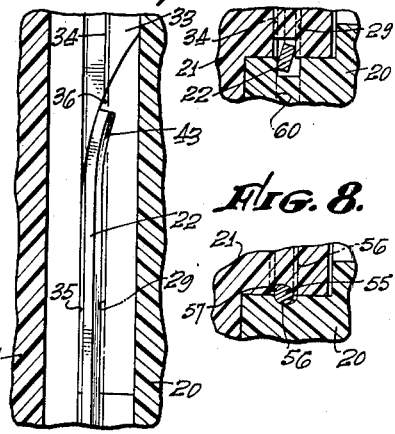
Fig. 7 is an enlarged partial sectional view taken along the line 7—7 of Fig. 4.
Fig. 8 is a view similar to a portion of Fig. 6, showing an alternative embodiment of the invention.
Fig. 9 is a view similar to Fig. 8, showing another alternative embodiment of the invention.

When it is desired to separate the two elements, they are rotated relative to each other in a direction opposite that of the arrows 48. When rotated thusly, the free end 43 of the clamp is the leading end of the clamp. During such rotation, this free end 43 will arrive at the notch and immediately drop down into the notch as seen in Fig. 4. Further rotation of the elements in the same direction will cause the end 43 to engage the sloped wall 36 and the end will be guided out of the overlapping groove, as shown in Fig. 7. The remainder of the clamp is fed out of the groove by continued rotation in the same direction for a revolution and then the two elements will come apart.

In Fig. 8, an alternative embodiment of the invention is disclosed having a clamp 55 which has a round cross-section. Semicircular grooves 56, 57 are provided in the elements 20, 21 respectively, these grooves corresponding in location and function to the grooves 29, 34 of the preferred embodiment previously described. The clamp 55 having the round cross section may be formed into a helix as was the clamp 22; however, nothing can be gained by twisting the round cross-section clamp. Such a round cross-section clamp will ordinarily not provide as strong a coupling force as the twisted rectangular cross-section clamp but will be suitable for certain applications of the invention.

While the clamp 22 is preferably carried on the element 20 as shown in Fig. 3, the clamp may be positioned in the overlapping grooves after the elements have been telescopingly engaged, such as by feeding the clamp into the grooves from the exterior of the element 20 through a slot 60 provided therein (Fig. 9).

Although exemplary embodiments of the invention have been disclosed and discussed, it will be understood that other applications of the invention are possible and that the embodiments may be subjected to various changes, modifications and substitutions without necessarily departing from the spirit of the invention.

We claim as our invention:

1. In combination: a first element having an internal cylindrical surface at one end with a peripheral annular groove in said internal surface; a second element having an external cylindrical surface at one end with a peripheral annular groove in said external surface, one of said surfaces having a notch therein said notch extending from said end of said element having said one surface and communicating with the groove thereof to provide a radial opening passing through said one end and eliminating a portion of the groove in said one surface, said elements being telescopingly engageable to bring said surfaces together so that said grooves overlap each other; stop means carried by one of said elements for contacting the other of said elements to limit relative axial movement of said elements; and a clamp of resilient material formed into an arc of less than a revolution, one end of said clamp being mounted to the other of said surfaces for positioning said clamp adjacent the groove in said other surface prior to engagement of said elements, the other end of said clamp being free with said clamp being moved through said notch and into said overlapping grooves by relative rotation of said telescopingly engaged elements in a direction such that said free end is the trailing end of said clamp, with said clamp being of a size to fit into said overlapping grooves and engage the walls of opposing grooves, said free end being normally bent out of said arc for entering said notch and guiding said clamp out of said grooves when said elements are relatively rotated in the opposite direction.

2. In combination: a first element having a first cylindrical shoulder extending from an end thereof; a second element having a second cylindrical shoulder extending from an end thereof, said shoulders being telescopingly engageable, the mating surfaces of said shoulders having overlapping, peripheral, annular grooves therein, one of said shoulders having a notch therein as deep radially as said one shoulder and extending from the outer end of said one shoulder and communicating with the groove thereof to provide a radial opening passing through said one shoulder; and a clamp fixed at one end to lie adjacent to the other of said shoulders prior to engagement of said elements, said clamp comprising a length of resilient material having a rectangular cross section and formed into an arc of less than a revolution with a major portion of said clamp being helical and twisted relative to a minor portion of said clamp adjacent said fixed end, the other end of said clamp being free and normally bent out of said arc, said fixed end guiding said clamp into said overlapping grooves when said shoulders are engaged and relatively rotated in one direction, with said rectangular cross section being of a size to fit into said overlapping grooves and engage the walls of opposing grooves, said clamp exerting forces urging said elements together when so positioned, said free end being guidable by a wall of said notch for leading said clamp out of said grooves when said elements are relatively rotated in the opposite direction.

3. In combination: a first element having an internal cylindrical surface at one end with a peripheral annular groove in said internal surface; a second element having an external cylindrical surface at one end with a peripheral annular groove in said external surface, one of said surfaces having a notch therein, said notch extending from said end of said element having said one surface and communicating with the groove thereof to provide a radial opening passing through said one end and eliminating a portion of the groove in said one surface, said elements being telescopingly engageable to bring said surfaces together so that said grooves overlap each other; stop means carried by one of said elements for contacting the other of said elements to limit relative axial movement of said elements; and a clamp of resilient material formed into an arc of less than a revolution, one end of said clamp being mounted to the other of said surfaces for positioning said clamp adjacent the groove in said other surface prior to engagement of said elements, the other end of said clamp being free, that portion of said clamp intermediate said ends being rectangular in cross section with a small length thereof adjacent said one end lying in a plane perpendicular to the axis of said surfaces and the remainder of said length being twisted relative to said small length, with said clamp being moved through said notch into said overlapping grooves by relative rotation of said telescopingly engaged elements in a direction such that said free end is the trailing end of said clamp, with said rectangular cross section being of a size to fit into said overlapping grooves and engage the walls of opposing grooves, and with said twisted portion axially compressed and exerting forces on said walls urging said elements together, said free end being normally bent out of said arc for entering said notch and guiding said clamp out of said grooves when said elements are relatively rotated in the opposite direction.

References Cited in the file of this patent

UNITED STATES PATENTS

| | | |
|---|---|---|
| 794,110 | McDowell | July 4, 1905 |
| 1,062,635 | Clements | May 27, 1913 |
| 1,157,007 | Landua | Oct. 19, 1915 |
| 1,272,229 | Daly | July 9, 1918 |
| 1,398,083 | Tibbetts | Nov. 22, 1921 |
| 1,464,386 | Ingram | Aug. 7, 1923 |
| 1,468,074 | Peirce | Sept. 18, 1923 |
| 1,809,620 | Cole | June 9, 1931 |
| 1,820,644 | Bach | Aug. 25, 1931 |
| 1,909,400 | Hall | May 16, 1933 |
| 1,995,006 | Mueller et al. | Mar. 19, 1935 |
| 2,038,870 | Rader et al. | Apr. 28, 1936 |
| 2,128,938 | Hall et al. | Sept. 6, 1938 |
| 2,310,250 | Melsom | Feb. 9, 1943 |
| 2,379,053 | Weingart | June 26, 1945 |
| 2,403,368 | Howard | July 2, 1946 |
| 2,461,863 | Zeeb | Feb. 15, 1949 |
| 2,562,621 | Larson | July 31, 1951 |
| 2,577,009 | Frantz | Dec. 4, 1951 |
| 2,650,853 | Michaels et al. | Sept. 1, 1953 |
| 2,677,933 | Hopkinson | May 11, 1954 |
| 2,749,154 | Smith | June 5, 1956 |
| 2,760,258 | Rieger | Aug. 28, 1956 |
| 2,779,375 | O'Connor | Jan. 29, 1957 |

FOREIGN PATENTS

| | | |
|---|---|---|
| 575,591 | Great Britain | Feb. 25, 1946 |